US009251336B1

(12) United States Patent
Semenzato et al.

(10) Patent No.: US 9,251,336 B1
(45) Date of Patent: Feb. 2, 2016

(54) SECURE VERSIONING OF SOFTWARE PACKAGES (71) Applicant: GOOGLE INC., Mountain View, CA (US)

(72) Inventors: Luigi Semenzato, Oakland, CA (US); William Alexander Drewry, Nashville, TN (US); Gaurav Shah, Mountain View, CA (US); Randall Spangler, San Jose, CA (US); Sumit Gwalani, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/252,373

(22) Filed: Apr. 14, 2014

Related U.S. Application Data (63) Continuation of application No. 13/007,390, filed on Jan. 14, 2011, now Pat. No. 8,745,612.

(51) Int. Cl.
*G06F 9/44* (2006.01)
*G06F 21/51* (2013.01)

(52) U.S. Cl.
CPC .................................... *G06F 21/51* (2013.01)

(58) Field of Classification Search
None
See application file for complete search history.

(56) References Cited

U.S. PATENT DOCUMENTS

| 8,239,509 B2 * | 8/2012 | Ferris et al. ................... 709/223 |
| 2005/0044401 A1 * | 2/2005 | Morrow et al. ............... 713/200 |
| 2008/0086517 A1 * | 4/2008 | Rodgers ........................ 707/203 |

* cited by examiner

*Primary Examiner* — Philip Wang
(74) *Attorney, Agent, or Firm* — Brake Hughes Bellermann LLP (57) ABSTRACT To provide a secure installation and execution software environment, locked version numbers are maintained. A locked version number associated with a software program may be stored. When a request is received to update the software program with an update package, a package number of the update package may be compared to the locked version number. The software program may be updated with the update package if the package number is at least as recent as the locked version number, and the updating of the software program with the update package may be restricted if the package number is earlier than the locked version number.

17 Claims, 7 Drawing Sheets

SECURE VERSIONING OF SOFTWARE PACKAGES

CROSS-REFERENCE TO RELATED APPLICATION

This application is a Continuation of, and claims priority to, U.S. patent application Ser. No. 13/007,390, filed on Jan. 14, 2011, entitled "SECURE VERSIONING OF SOFTWARE PACKAGES", the disclosure of which is incorporated by reference herein in its entirety.

FIELD

The field relates to the installation and execution of software programs.

BACKGROUND

Software programs, such as operating systems, firmware, and applications, are prone to security flaws. These flaws, although initially hidden or unidentified, may eventually be identified, and become widely known. In order to fix these security flaws and/or fix other problems, such as compatibility issues, software programs may be updated through patches or upgrades.

However, even after a software program has been patched to fix a security flaw, malicious attackers may attempt to take advantage of security flaws in an older version through a "rollback attack." In a rollback attack, a malicious attacker attempts to install an older version of a software program with known security vulnerabilities. If the older version is successfully installed and executed, then the attacker may capitalize on the known security vulnerabilities.

BRIEF SUMMARY

Embodiments relate to secure versioning of software packages. In one embodiment, a method for restricting installation and execution of a superseded software program includes storing a locked version number associated with a software program and receiving a request to update the software program with an update package associated with a package number. The method further includes comparing the package number with the locked version number, determining whether to update the software program based at least in part on the comparison, updating the software program with the update package when the package number is at least as recent as the locked version number, and restricting the updating of the software program with the update package when the package number is earlier than the locked version number.

In another embodiment, a method for restricting execution of a superseded software program includes storing a locked version number associated with a software program and receiving a request to execute the software program associated with an execution version number. The method further includes comparing the execution version number with the locked version number, determining whether to execute the software package based at least in part on the comparison, executing the software program when the execution version number is at least as recent as the locked version number, and restricting the execution of the software program when the execution version number is earlier than the locked version number.

In another embodiment, a system for restricting installation and execution of superseded software program includes a locked version number storage for storing a locked version number associated with a software program, a software package updater for updating the software program with an update package associated with a package number, and a version comparator for comparing a package number of the software program with the locked version number.

In one embodiment, a computer program product includes a computer readable storage medium having control logic stored therein for causing a computer to restrict installation of a superseded software program. The control logic includes a first computer readable program code that stores a locked version number associated with a software program and a second computer readable program code that receives a request to update the software program with an update package associated with a package number. The control further includes a third computer readable program code that compares the package number with the locked version number, a fourth, computer readable program code that determines whether to update the software program based at least in part on the comparison, a fifth computer readable program code that updates the software program with the update package when the package number is at least as recent as the locked version number, and a sixth computer readable program code that restricts the updating of the software program with the update package when the package number is earlier than the locked version number.

Further embodiments, features, and advantages, as well as the structure and operation of the various embodiments, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto.

Those skilled in the art with access to the teachings provided herein will recognize additional modifications, applications, and embodiments within the scope thereof and additional fields in which the invention would be of significant utility.

It is noted that references in the specification to "one embodiment," "an embodiment," "an example embodiment," etc., indicate that the embodiment described may include a particular feature, structure, or characteristics, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in common with other embodiments whether or not explicitly described.

Example of Secure Versioning of Software Packages

Various embodiments include methods and systems for secure versioning of software packages. Software programs, such as applications, firmware, and operating systems, may be updated through software packages, or update packages. An update package may upgrade the current version of a software program to a newer version that adds new features and fixes bugs, such as compatibility issues and security vulnerabilities. Alternatively, an update package may be an earlier version of a software program. In a "rollback attack," an attacker may try to update a computer with a superseded software program. The superseded software program, or an older version of a software program, may have a known security vulnerability. Once the compromised software program has been installed, the attacker may exploit the security vulnerability. Thus, preventing the installation of superseded software programs is an important measure for thwarting malicious attacks.

In one example, a software program, such as a spreadsheet application, may be installed on a computer. When the spreadsheet is first installed, the version number of the spreadsheet may be stored as a locked version number. By "locked" it is meant that access to and/or modification of the stored version numbers may be restricted. For example, write access to the locked version number may be restricted and/or prohibited. In the example, the locked version number may be modified by software programs with high enough privilege levels, such as the operating system, but may not be modified by software programs with lower privilege levels, such as the spreadsheet application itself, or other application-level programs.

Later, a request may be received to update the spreadsheet application with an update package. The update package, which may be an earlier or later version than the installed software program, includes a package number associated with the version number of the upgrade. The package number may be compared with the locked version number to determine whether to update the software program. If the update package, as reflected by its package number, is at least as recent as the currently installed version of the spreadsheet, as reflected by its locked version number, then the software program may be updated with the update package. If the update package is less recent (e.g. a downgrade) than the current version of the spreadsheet, then the updating of the software program with the update package may be restricted. A restricted update may be overridden by a manual user input, which may confirm that the request to downgrade the spreadsheet is intended by the user, and is not an automated rollback attack.

Illustrated Systems for Secure Versioning of Software Packages

Figure 1:
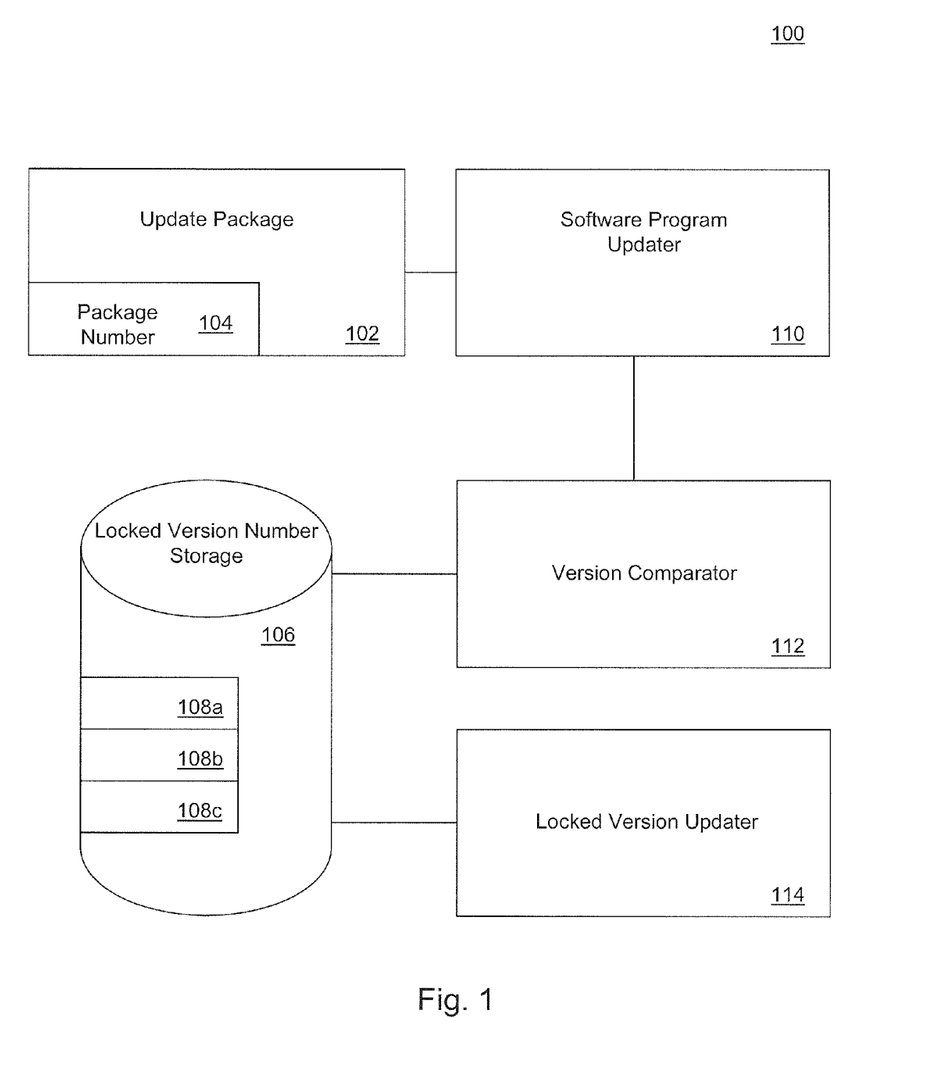
FIG. 1 is a block diagram of a system for secure versioning of software packages according to an embodiment.

FIG. 1 is a block diagram of a system 100 for secure versioning of software packages according to an embodiment of the invention. System 100 includes an update package 102, a locked version number storage 106, a software program updater 110, a version comparator 112, and a locked version updater 114.

Software programs installed on system 100 may be updated with a software package such as update package 102. Update package 102 may be a revision or patch of a software program, and may include one or more files, for example and without limitation, executable files, configuration files, drivers, and/or other files.

Update package 102 may include a version identifier such as package number 104. In one embodiment, package number 104 may represent the version number of the update package. In one example, update package 102 upgrades version 1.0 of an installed software program to version 2.0. Accordingly, package number 104 may be 2.0. In another embodiment, package number 104 may represent the version number of the last and/or latest security patch. In one example, update package 102 may upgrade service pack 7 to service pack 8. However, update package 102 may not include any additional security fixes. Thus, in the example, package number 104 of update package 102 may be service pack 7.

Package numbers may be sequentially ordered, such that newer update packages may be associated with higher package numbers, and older update packages may be associated with lower package numbers. The locked version numbers may be sequentially ordered in a similar manner. In an embodiment, package numbers may not be increasing. For example, a new update package may not include any additional security fixes to a previous update package. In such embodiments, the new update package may have the same package number as the previous update package, and installing the new update package may not preclude later rolling back to the original update package.

Locked version number storage 106 may store one or more locked version numbers 108a, 108b, 1.08c. Each locked version number 108a, 108b, 108c may be associated with a software program. When a software program is installed, the version number of the software program may be stored as locked version number 108a in locked version number storage 106. Later, when the software program is updated with update package 102, package number 104 of update package 102 associated with the software program may replace the locked version number 108a in locked version number storage 106.

Each software program may be associated with one or more locked version numbers stored in locked version number storage 106. In an embodiment, a single locked version number may be stored for each software program. In another embodiment, a first locked version number and a second locked version number may be stored for a software program.

Access to locked version number storage 106 (e.g. read-only access and/or read-write access) may be restricted. In an embodiment, access to locked version number storage 106 may be restricted according to a privilege level. Certain software programs, such as software program updater 110, an operating system, or a boot loader (i.e. boot stub), may have a high enough privilege level to read and/or modify (e.g.

update) locked version number storage 106. Other software programs, such as an application, may not have a high enough privilege level to read and/or modify locked version number storage 106. Such lower-privileged software programs may not need to read and/or modify locked version number storage 106.

In another embodiment, restrictions may be imposed according to a software program or, in relation to other events, such as during the boot cycle, or for a specific time period. As an example, locked version number storage 106 may be accessible only to read-only firmware during a boot-up sequence. By limiting access to locked version number storage 106 to read-only firmware, which may be pre-loaded by a manufacturer, access to locked version number storage 106 may be limited to trusted software programs, restricting the ability of unauthorized access to the locked version number storage 106.

Locked version number storage 106 may begin operation in read-and-write mode when a computer is powered on. During operation of the computer, commands may lock some or all of locked version number storage 106, making specific portions or all of locked version number storage 106 inaccessible or read-only until the next boot cycle.

Locked version number storage 106 may be stored in one or more physical and/or logical memory locations. In an embodiment, locked version number storage 106 may be stored in a non-volatile random access memory (NVRAM). A trusted platform module (TPM) chip, for example, may include NVRAM where the locked version numbers may be stored. Non-volatile memory may preserve its content across reboots, and/or when the computer is powered off.

One exemplary interface between locked version number storage 106 stored in NVRAM on a TPM chip and version comparator 112 may include three primitive commands: write( ), read( ), and lock( ). Each primitive command may accept one or more arguments, such as ADDRESS, DATA, and LENGTH. A command to write(ADDRESS, DATA, LENGTH) may write, or store DATA with a byte size LENGTH in locked version number storage 106 at ADDRESS. Similarly, a command to read(ADDRESS, LENGTH)→DATA may read, or load a locked version number with a byte size LENGTH from locked version number storage 106 at ADDRESS.

A command to lock(ADDRESS, LENGTH) may lock a portion of locked version number storage 106, for example, from ADDRESS to ADDRESS+LENGTH. Locking the locked version storage 112 may make some of all of the locked version numbers 108 inaccessible, or read-only. The location locked by the lock command may be automatically locked for a certain time period, such as until the next boot cycle (e.g. following a reboot).

The lock( ) primitive may enforce a hierarchy of locked version number privileges. When the computer starts, or boots, firmware that executes first may be the most trusted software program on the system, and have the highest access privileges. As the boot sequence progresses, privileges may be revoked by successively locking sections of locked version number storage 106. In one example, a boot stub loads data and other software programs into memory upon boot-up. As the boot stub progresses through entries or sections in locked version number storage 106, the boot stub checks and locks the NVRAM containing the next section's version before it starts executing that next section.

In another embodiment, locked version number storage 106 may be accessed and maintained by the operating system. For example, locked version numbers 108 may be stored in an association table. More specifically, locked version numbers 108 may be stored in locked version number storage 106 as a persistent association table primitive. In still other embodiments, locked version number storage 106 may include a plurality of locked version number storage areas. For example, locked version number storage 106 may comprise a first locked version number storage and a second locked version number storage. The first locked version number storage may reside in a portion of NVRAM on a TPM chip, and the second locked version number storage may be maintained in an association table by the operating system.

One exemplary interface between locked version number storage 106 and an operating system includes three commands: define( ), write( ), and read( ). Each command may accept one or more arguments, such as TAG, LENGTH, and DATA. A command to define(TAG, LENGTH) may define, or create, an entry in locked version number storage 106 at TAG and a byte size LENGTH. A command to write(TAG, DATA) may write, or store, DATA in locked version number storage 106 at TAG. A command to read(TAG)→DATA may read, or retrieve, DATA from locked version number storage 106 at TAG.

In some embodiments where the operating system maintains the locked version number storage, locking locked version number storage 106 (as through a lock command, for example) may not be necessary due to access restrictions based on privilege level. In some such embodiments, writing to locked version number storage 106 (as through a write command, for example) may only be available at higher privilege levels. A software application may not have a high enough privilege level to access locked version number storage 106 maintained by the operating system, whereas software program updater 110 may have a high enough privilege level to access locked version number storage 106.

When system 100 is initially configured, locked version number storage 106 may be initialized with zero entries, or with no stored locked version numbers. As an alternative, locked version number storage 106 may be populated with one or more pre-installation locked version numbers. A pre-installation version number may reside in locked version number storage 106 before the installation of a corresponding software program. For example, the version number of a video game software program may be stored as a pre-installation version number in locked version number storage 106. In such an example, system 100 may preemptively restrict the installation of superseded software programs.

Locked version number storage 106 may be updated based on the successful update of a software program with an update package. Once a software program is updated with an update package, the associated locked version number may be updated after the upgraded software program successfully executes. In an alternative, locked version number storage 106 may be updated independently of the updating or execution of a software program, such as through a periodic distribution list of updated version numbers. For example, an operating system may periodically download a list of updated or most-secure version numbers. The operating system may update locked version number storage 106 based on the downloaded list.

Software program updater 110 may generate a request to update a software program with update package 102. If the update request is granted, software program updater 110 may subsequently update the software program with update package 102. Software program updater 110 may be an installer that installs a software program and/or an update package. Some instances software program updater 110 may be specific to one update package and/or one software program. For example, a first firmware upgrade uses a first software program updater, a second firmware upgrade uses a second software program updater, and a third firmware upgrade uses a third software program updater. Alternatively, other instances of software program updater 110 may be generic, and used with a plurality of update packages. For example, a productivity suite of software programs, including a word processing application, a spreadsheet application, and a presentation application, may all be installed and/or updated by one software program updater 110.

Version comparator 112 may determine whether a software program associated with the update package has a pre-existing entry in locked version number storage 106. If there is a pre-existing locked version number associated with the software program stored in locked version number storage 106, then version comparator 112 may compare package number 104 of update package 102 with stored locked version number 108a and determine whether to update the software program based at least in part on the comparison. If there is no stored locked version number for the software program in locked version number storage 106, then the software program, in the form of update package 102, may be installed for the first time.

In order to access locked version number storage 106, version comparator 112 may have a higher privilege level than update package 102, software program updater 110 and/or a software program. In one embodiment, software programs with lower privileges may have read-only access to locked version number storage 106, while software programs with higher privileges may have read/write access to locked version number storage 106. Version comparator 112 may compare package number 104 before software program updater 110 updates the software program with update package 102.

Version comparator 112 may determine whether to update the software program with update package 102 based at least in part on a comparison of package number 104 and locked version number 108a. Version comparator 112 may allow the update of the software program with update package 102 to proceed when package number 104 is at least as recent as the locked version number 108a. Version comparator 112 may restrict the update of the software program with upgrade package 102 when package number 104 is earlier than locked version number 108a. When the update of the software program is restricted, version comparator 112 may generate a warning. Additionally, version comparator 112 may generate a prompt or a request for a manual override of the restriction.

Locked version updater 114 may update one or more locked version numbers 108 in locked version number storage 106. Locked version numbers 108 may be updated with package number 104 of the recently installed and/or executed update package 102. In one embodiment, locked version updater 114 may update a locked version number 108 after a software program is successfully updated with update package 102. In another embodiment, locked version updater 114 may update a locked version number 108 after the updated software program is successfully executed. In still another embodiment, a new update package 102 may be installed, but a locked version number 108 may not be updated. For example, a computer has service pack 1 of an operating system currently installed. Later, service pack 3 of the operating system may be successfully installed. Service pack 3 may not include any additional security fixes from service pack 1, however. Thus, locked version updater 114 may not update locked version number 108a with the version number (e.g. service pack 3) of the update package 102. Updating locked version number 108 in locked version number storage 106 may successfully restrict the installation and execution of superseded software programs, thus preventing rollback attacks.

Figure 2:
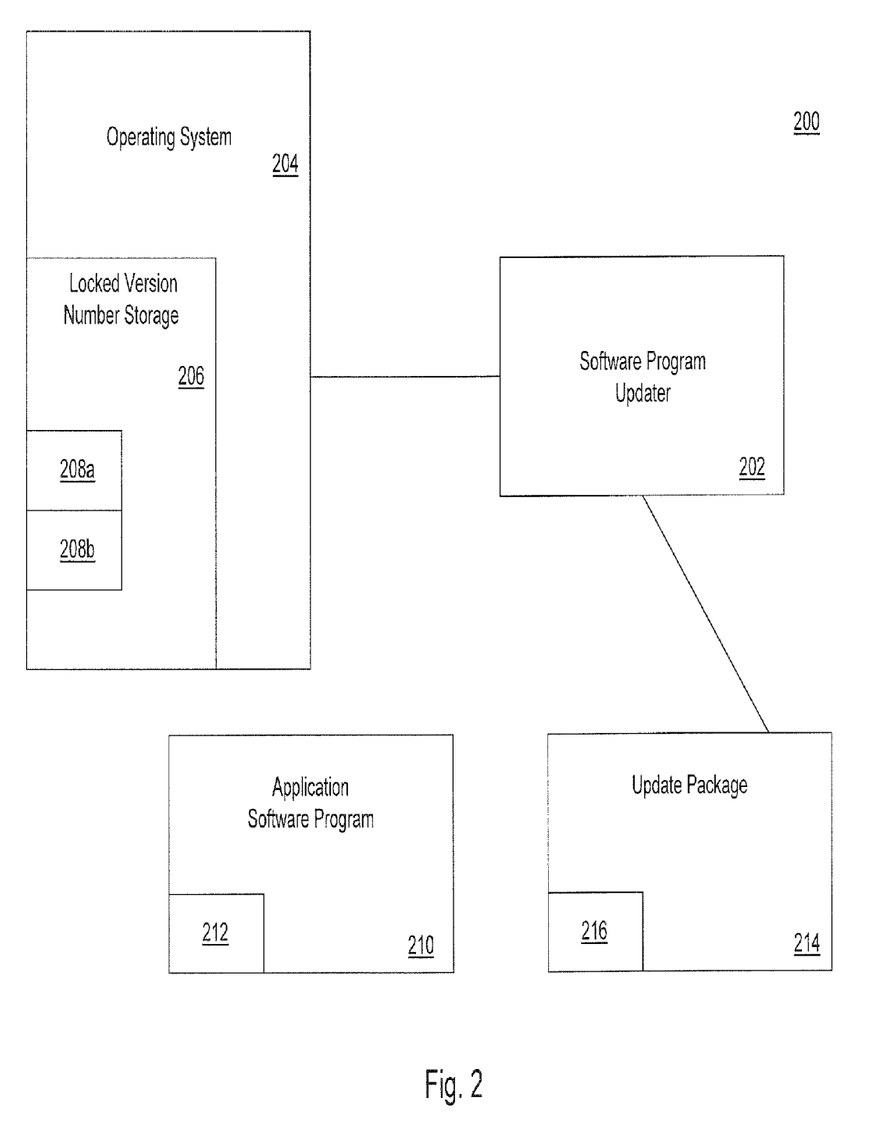
FIG. 2 is a block diagram of a system for secure versioning of software packages according to an embodiment.

FIG. 2 is a block diagram of a system 200 for secure versioning of update packages according to an embodiment. System 200 may include an operating system 204, a software program updater 202, an application software program 210, and an update package 214.

Operating system 204 may maintain locked version number storage 206. As one example, locked version number storage 206 may be maintained in an association table. Locked version number storage 206 may include, a first locked version number 208a and a second locked version number 208b. In an embodiment, one or more locked version numbers 208a, 208b may be associated with a single software program installed on system 200, such as application software program 210. In another embodiment, locked version numbers 208a, 208b may be associated with one or more software programs yet to be installed on system 200.

Application software program 202 may be installed on system 200. Examples of application software programs include, for example and without limitation, word processors, web browsers, video games, and media players. Application software program 210 may include a version number 212. When multiple versions of application software program 210 are issued, each version number for convenience herein is referenced as version number 212a, 212b, etc. First locked version number 208a and second locked version number 208b may be associated with application software program 210.

Software program updater 202 may request to update application software program 210 with update package 214. Update package 214 may include a package number 216. Package number 216 may represent the version number of the update package 214.

In an embodiment, first version number 212a may correspond to an automatic mode for updating application software 210, and second version number 212b may correspond to a manual mode for updating application software 210. In the embodiment, version comparator 112 may compare package number 216 with a locked version number based on the type of the request or mode of operation. If a request to install update package 214 is an automatic request, then version comparator 112 may compare package number 216 with first locked number 208a corresponding to an automatic mode. If a request to install update package 214 is a manual request, then version comparator 112 may compare package number 216 with second locked number 208b corresponding to a manual mode.

If package number 216 is at least as recent as a corresponding locked version number, then application software program 210 may be updated with update package 214, and a locked version number may be updated. If package number 216 is older than a corresponding locked version number, then the update of application software program 210 with update package 214 may be restricted.

Figure 3:
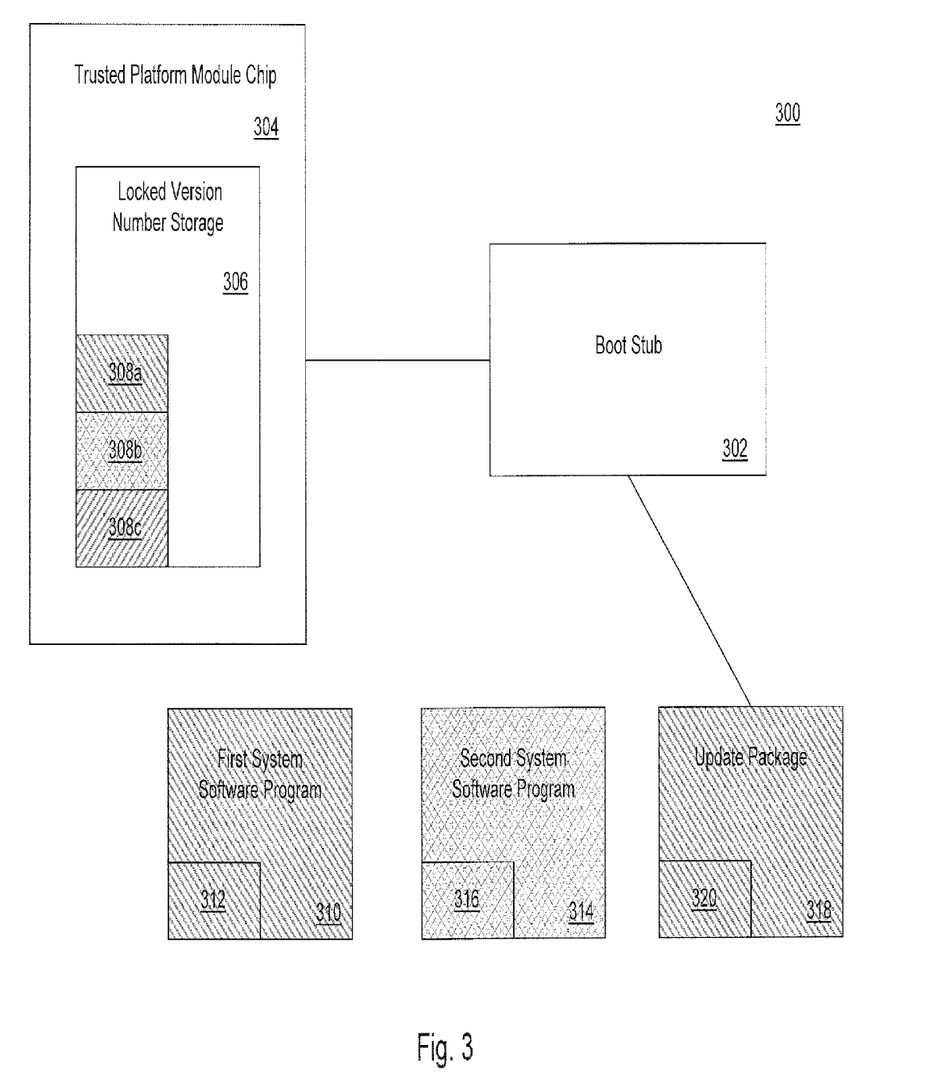
FIG. 3 is a block diagram of a system for secure versioning of software packages according to an embodiment.

FIG. 3 is a block diagram of a system 300 for secure versioning of update packages according to an embodiment. System 300 may include a trusted platform module chip 304, a boot stub 302, first system software program 310, second system software program 314, and an update package 318. Trusted platform module chip 304 may include locked version number storage 306. Locked version number storage 306 may be stored in non-volatile memory such as, for example and without limitation, NVRAM.

First system software program 310 and second system software program 314 may each be a system software program, such as and without limitation an operating systems, device driver, and/or firmware. First system software program 310 and second system software program 314 may each be installed on system 300. First system software program 310 may include a first version number 312. Similarly, second system software program 314 may include a second version number 316.

Locked version numbers 308a, 308b, 308c stored in locked version number storage 306 may be associated with a version number of a currently installed system software program. For example, locked version number 308a may be associated with first version number 312 of first system software program 310 (as indicated by the diagonal shading), and locked version number 308b may be associated with second version number 316 of second system software program 318 (as indicated by the crosshatch shading). Locked version number 308c may be associated with a third system software program (not shown in FIG. 3), or alternatively, be associated with a software program yet to be installed on system 300.

During a boot process, boot stub 302 may request to update first system software program 310 with update package 318. Update package 318 may be a new version of first system software program 310. Update package 318 may include a package number 320 which corresponds to the new version number.

Version comparator 112 may compare package number 320 with a locked version number associated with the system software program 310, for instance locked version number 308a. If package number 320 is at least as recent as locked storage number 308a, then system software program 310 may be updated with update package 314, and locked version number 308a may be updated with package number 320. If package number 320 is older than locked storage number 308a, then the update of system software program 310 with update package 318 may be restricted.

Illustrated Methods for Secure Versioning of Software Packages

Figure 4:
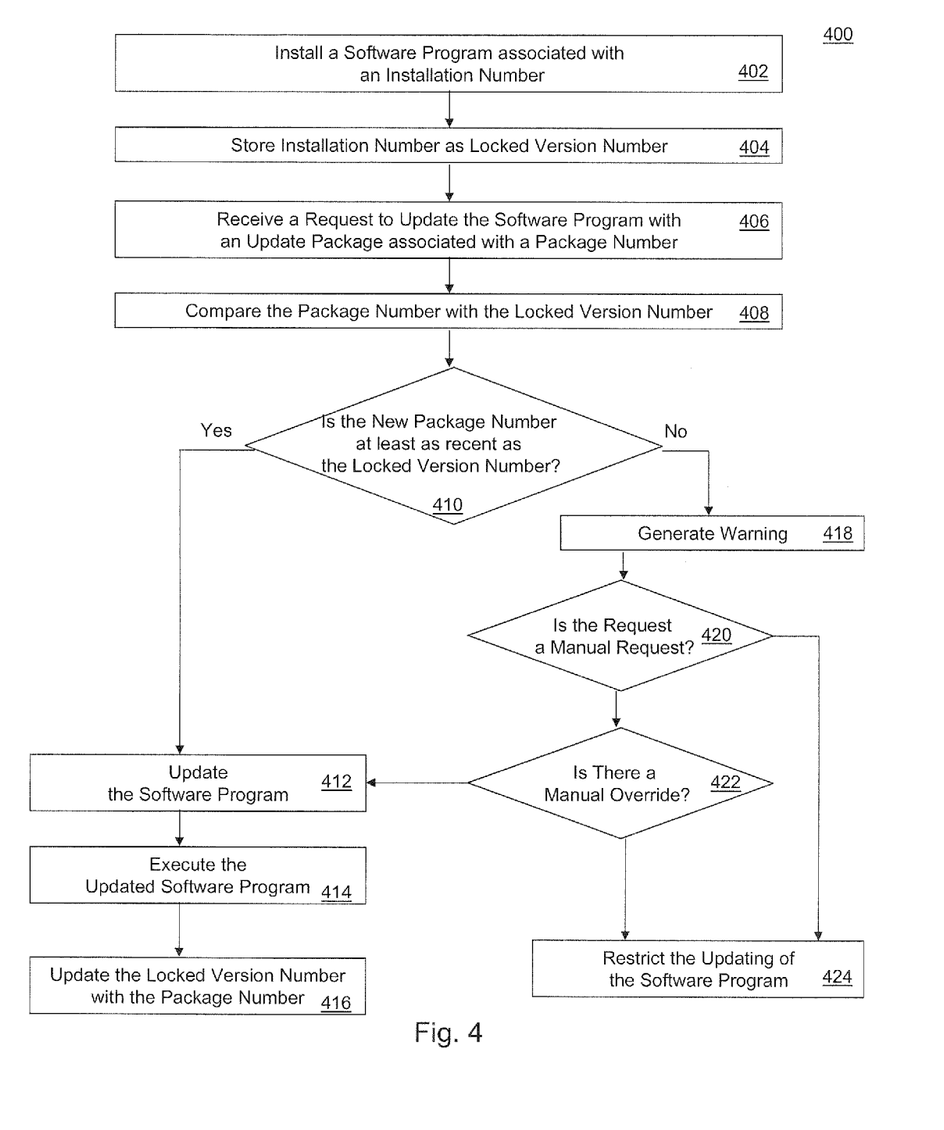
FIG. 4 is a flow diagram of a method for secure versioning of software packages according to an embodiment.

FIG. 4 is a flow diagram of a method 400 for secure versioning of software packages according to an embodiment. Method 400 begins at stage 402 when a software program associated with an installation number may be installed.

The installation number may represent the version of a software program which is initially installed onto a system. In one example, version 7.0.517.41 of the Google Chrome browser may be installed onto a computer for the first time. Accordingly, the installation number of the Chrome update package may be 7.0.517.41. As another example, the Eclair version of the Android operating system may be installed on a mobile computing device. If the Eclair release is considered version 2.1 of Android, then the installation number of the Android operating system may be 2.1.

Version numbers may be formatted according to a variety of schemes. In one example, each new version or revision of a software program may be assigned a numerically sequential version number. The first release of the software program may be version 1.0. The next release of the software program may be version 1.1, or version 2.0, or some other number higher than the first version number. The higher version number may be easily recognizable as a more recent release than the lower version number. In another example, each new version of a software program may be assigned a sequential alphanumeric version number, such as version number 1.A, 1.B, 1.C, and so firth. In a third example, each new version of a software program may be assigned a version number corresponding to its date of release.

Before, during, or after the initial installation of the software program 400, the installation number may be stored as a locked version number at stage 404. When a software program is installed for the first time on a computer, a new entry may be created in locked version number storage 106, and populated with the installation number associated with the update package. In one alternative, locked version number storage 106 may be pre-populated with one or more locked version numbers before specific update packages may be installed. By pre-populating locked version number storage 106, the installation of compromised update packages may be further inhibited.

After a software program has been installed, a request to update the software program with an update package may be received at stage 406. The update package may be associated with a package, number. The update package may be an upgrade, patch, service pack, or the like.

The request to update the software program with the update package may be a manual request initiated by a user. For example, a user may direct software program updater 110 to update the software program with an update package found on removable storage. Alternatively, the request to update the software program may be automatically generated. For example, software program updater 110 may routinely check for and automatically download available updates for one or more software programs. After an update package has been successfully downloaded, software program updater 110 may then automatically request to update the software program. An automatic request to update a software program with an update package may be generated locally or remotely.

After a request to update a software program with an update package is received at stage 406, the package number of the update package may be compared with the locked version number at stage 408. Version comparator 112 may compare the package number with the locked version number. The locked version number may be associated with the initial installation of a software program, or with a previously installed update or patch to the same software program.

As one alternative, locked version number storage 106 may be pre-populated with one or more locked version numbers. An operating system may natively include a list of version numbers of popular applications. This list of version numbers may be used to populate locked version number storage 106, even though some or all of the popular applications may never be installed onto the system. By storing pre-installation locked version numbers, superseded versions of software programs with known security flaws may be foreclosed from ever installing onto the system.

Version comparator 112 may determine whether to update the software program based at least in part on the comparison. At stage 410, version comparator 112 may determine whether the package number is at least as recent as the locked version number. If the package number is at least as recent as the locked version number, then the update package may be either a newer version or the same version as the currently installed software program installed. In this case, the request to update the software program may likely be a legitimate update request, and not a rollback attack. Alternatively, if the package number is earlier than, or lower than, the locked version number, then the update package may be an older version than the currently installed version. In this case, the request to update the software program may be a malicious rollback attack.

In an embodiment, version comparator 112 may compare the package number with a first locked version number in a first mode, and may compare the package number with a second locked version number in a second mode. In one example, method 400 may include an automatic mode and a manual mode. Locked version number storage 106 may store both a first locked version number associated with the automatic mode and a second locked version number associated with the manual mode. In the automatic mode, version comparator 112 may compare the package number with the first locked version number. In the manual mode, version comparator 112 may compare the package number with the second locked version number.

If the package number is at least as recent as the locked version number, then the software program may be updated with the update package at stage 412. The software program updater 110 may update the software program with update package 102. Updating a software program may include one or more steps such as unpacking compressed files in the update package, copying files of the update package to an intended installation location, customizing an installation/update, and providing information about the software program to the operating system.

After the software program is successfully updated at stage 412, the updated software program may be executed at stage 414. Although a request to execute the updated software program may not have been received, executing the updated software program may verify proper installation and functioning of the update package. If the updated software program does not function correctly, then the update package may be manually or automatically uninstalled, and the locked version number may not be updated.

At stage 416, the locked version number may be updated with the package number. The package number may be updated after the successful installation and execution of the update package. This delay may ensure that a non-functional software program version number is not stored in the locked version number storage. In other embodiments, the locked version number may be updated after the software program is updated (and before execution of the updated software program), or updated independently of the installation and/or execution of an update package.

Figure 6:
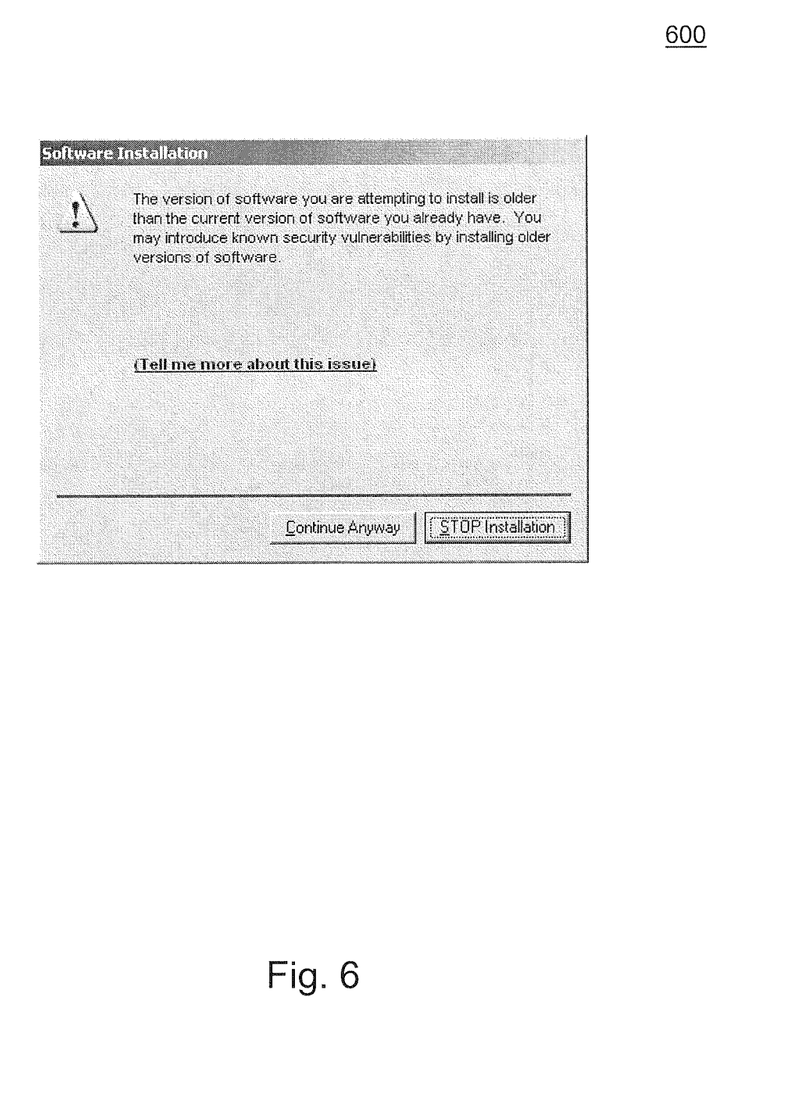
FIG. 6 is an illustration of a user interface for secure versioning of software packages according to an embodiment.

If the package number is not as recent as the locked version number, then a warning may be generated at stage 418. Updating a software program with an older or superseded update package may have security implications, such as introducing known security vulnerabilities to a computer. The warning may provide a visual, audible, and/or tactile notification about the dangers of installing a superseded software program. As described below. FIG. 6 illustrates one example of a visual warning in the form of a screen shot.

In an embodiment, a warning may not be generated. For example, when a request to perform a downgrade is generated automatically, or remotely, then the installation of the downgrade may be restricted automatically, without warning.

Some embodiments may determine the type of the request and/or a mode of operation, and apply a different policy according to each type and/or mode. As shown in FIG. 4, if a package number is earlier than the locked version number, then it may be determined whether the request to update the software program is a manual request or an automatic request at stage 420. The version comparator 110 may distinguish between an automatic request and a manual request to update a software program with an update package 102, and apply different policies to each type.

Rollback prevention may be applied to both manual and automated update requests. However, in an embodiment it may be preferable to allow a manual request to 'downgrade' to an earlier version to proceed. After a software program is updated with a new update package the updated software program may belatedly malfunction, or behave differently than a user imagined. Or, a computer may become corrupted, and the older version of the software program may be the only version available to install during the system reconstruction process.

At stage 422, it may be determined whether there is a manual override to a request to update a software program with a superseded update package. The manual override may overcome a restriction to the update of the software program with the superseded update package. A manual override may require that a user be physically present at the computer, and informed of the dangers of downgrading a software program to a superseded version.

The manual override may verify the user's physical presence through a delayed manual confirmation after some non-negligible amount of time, for example and without limitation, 1 second, 2 seconds, 5 seconds, 1 minute, or 5 minutes. By delaying confirmation of the manual override, "fly-by" attacks may be avoided.

In an embodiment, physical presence may be verified by toggling a physical switch. For example, when downgrading system software programs, a key may be pressed, or a switch may be toggled. Such physical switches may include, for example and without limitation, keyboard keys, mouse buttons, click wheel buttons, or volume switches. The state of the switch may be read by the operating system or some other software program. The manual override may rely on uncompromised or valid software programs. Validity of software programs attempting to install an update package may be asserted, for example, through a verified boot mechanism that may ensure executed code is valid, If a manual override is triggered, the software program may be updated with the superseded update package at stage 412, and the updated software program executed at stage 414. Finally, after the software program has been successfully updated with the superseded update package, the locked version number may be updated at stage 416 with the package number of the superseded update package. In one alternative, even in the case of a manual override and successful execution of a superseded software program, the associated locked version number may not be updated. By not updating the locked version number with a superseded version number, a manual override may still be required in later installations of the same superseded software program.

At stage 424, the installation of the update package may be restricted. In an embodiment, if the request to update a software program with a superseded update package is an automatic request, then the update of the software program with the update package may be restricted. Many "rollback attacks" may be automatically initiated, without any user input. Thus, restricting installation of automatic requests to install a superseded software program may prevent rollback attacks. In an embodiment, a manual request to update a software program with an update package may result in a restricted installation, such as when a manual override fails.

Figure 5:
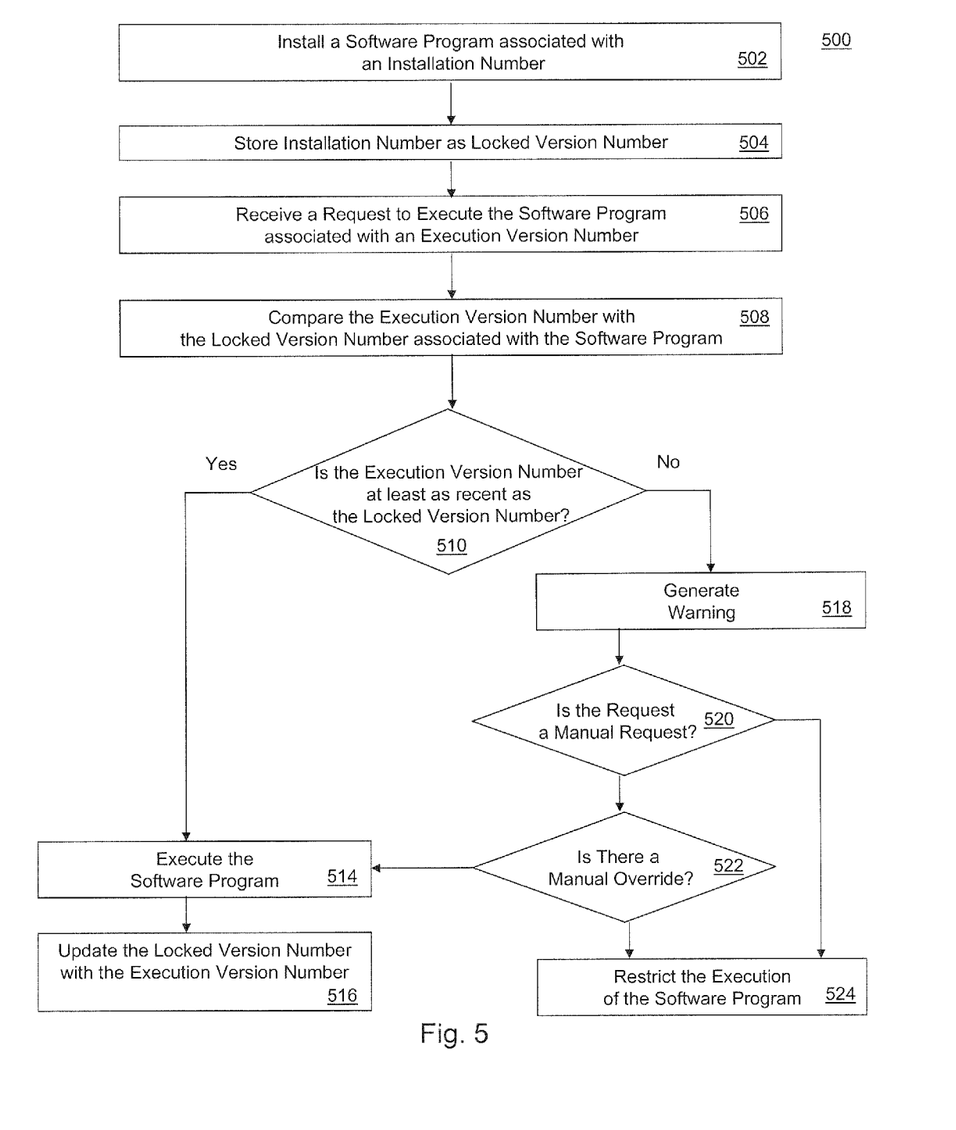
FIG. 5 is a flow diagram of a method for secure versioning of software packages according to an embodiment.

FIG. 5 is a flow diagram of a method 500 for secure versioning of software packages according to an embodiment. Method 500 begins at stage 502 when a software program associated with an installation number may be installed. Installing a software program may include, for example and without limitation, unpacking compressed files, copying files to an installation location, customizing the software program for a user and/or computer, and/or providing information about the software program to the operating system.

At stage 504, the installation version number may be stored in locked version number storage 106 as locked version number 108a. Next, at stage 506, a request to execute a software program associated with an execution version number may be received. The request may be a manual request, based on user direction, or an automatic request to execute a software program (such as in an auto-execute batch file). The execution version number represents the version of the update package requested to be executed.

At stage 508, the execution version number may be compared with the locked version number associated with the software program. Version comparator 110 may compare the execution version number with the locked version number, and may additionally determine whether to execute the software program based at least in part on the comparison.

At stage 510, Version comparator 110 determines whether the execution version number is at least as recent as the locked version number. In an embodiment, the version comparator 110 may determine whether the execution number is the same as the locked version number. A request to execute a software program with a different version number than the currently installed version of the same software program may indicate a compromised software program and/or a rollback attack.

If the execution version number is at least as recent as the locked version number, then the software program may be executed at stage 514. The locked version number may be updated with the execution version number of the software program at stage 516.

If the execution version is not as recent as the locked version number, then a warning may be generated at stage 518. The warning may include a pop-up window, a task bar alert, an audible warning sound effect, a keyboard vibration, or some other warning indication. In some embodiments no warning may be generated.

Method 500 may include a plurality of modes, and apply a different policy for each mode. As shown in FIG. 5, if the execution number is not as recent as the locked version number at stage 510, then it may be determined whether the request to execute the software program is a manual request or an automatic request at stage 520. Method 500 may apply one policy for a manual execution request, and another policy for an automatic execution request.

In the event that the request to execute the software program was a manual request (e.g. a user request), then it may be determined whether there is a manual override to restricted execution at stage 522. If there is a manual override to the restricted execution of a superseded software program, then the software program may be executed at stage 514.

If there is no manual override to the restricted execution, or alternatively, if the request to execute the software program is an automatic request, then the execution of the software program may be restricted at stage 524.

FIG. 6 is an illustrated screen shot 600 of a method for secure versioning of software packages according to an embodiment. As shown in FIG. 6, the warning may be a window reading "the version of software you are attempting to install is older than the current version of software you already have." Warnings such as the one shown in FIG. 6 may inform the user about risks to installing outdated or superseded software programs, such as potentially introducing known vulnerabilities to the computer. Warnings may provide other information, such as the current installed version of the software program, the latest available version of the software program, and/or the locked version number. Visual warnings may be generated as a new window, as an alert on a task bar, with a warning sound, or through some other method.

Example Computer Embodiment

Figure 7:
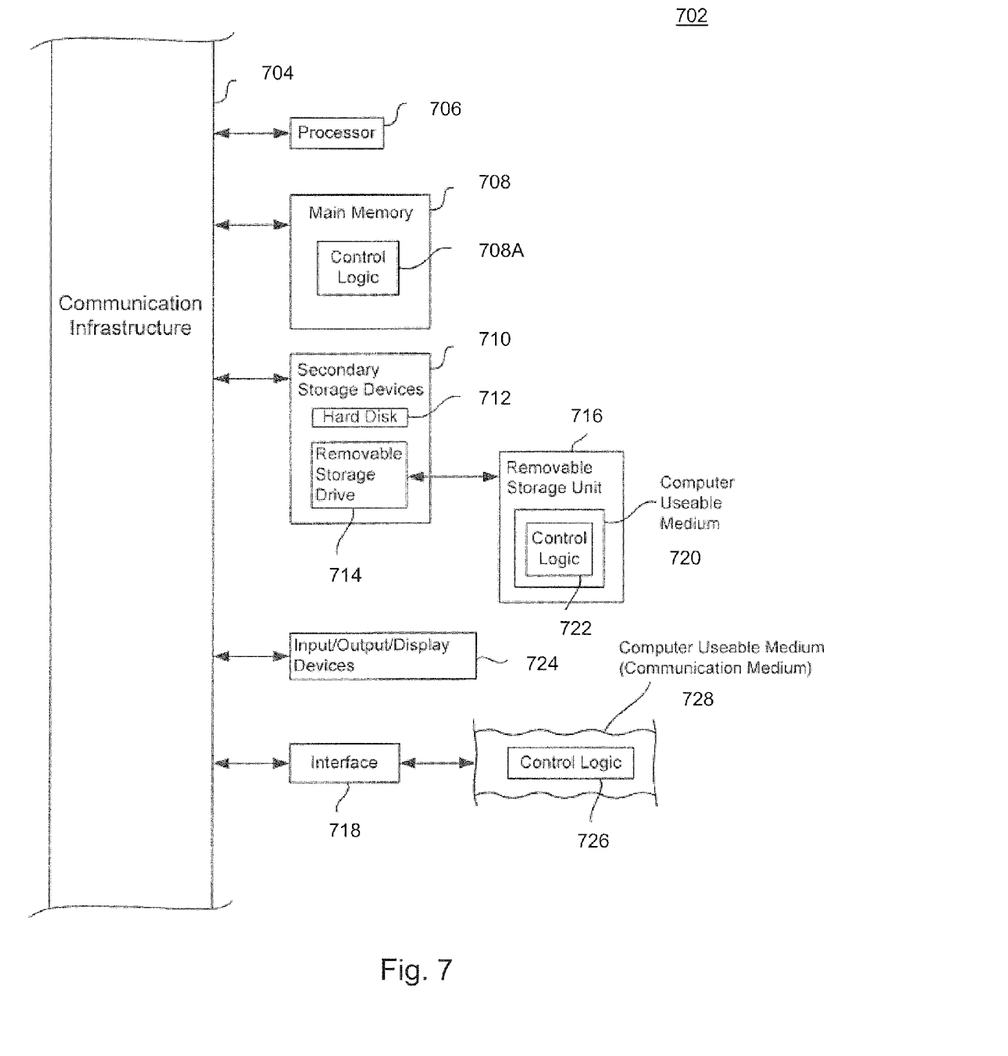
FIG. 7 is a block diagram of a system for secure versioning of software packages according to an embodiment.

In an embodiment, the system and components of embodiments described herein are implemented using well known computers, such as example computer 702 shown in FIG. 7. For example, locked version number storage 106, software program updater 108, version comparator 110, and locked version updater 112 may be implemented using computer(s) 702.

Computer 702 can be any commercially available and well known computer capable of (performing the functions described herein, such as computers available from International Business Machines, Apple, Sun, HP, Dell, Compaq, Cray, etc. Computer 702 can also be any commercially available and well known tablet, mobile device or small-phone capable of performing the functions described herein, such as devices available from Apple, HTC, RIM, Nokia, Sony, etc.

Computer 702 includes one or more processors (also called central processing units, or CPUs), such as a processor 706. Processor 706 is connected to a communication infrastructure 712.

Computer 702 also includes a main or primary memory 708, such as random access memory (RAM). Primary memory 708 has stored therein control logic 708A (computer software), and data.

Computer 702 also includes one or more secondary storage devices 710. Secondary storage devices 710 include, for example, a hard disk drive 712 and/or a removable storage device or drive 714, as well as other types of storage devices, such as memory cards and memory sticks. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 720 having stored therein computer software 722 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 702 also includes input/output/display devices 724, such as monitors, keyboards, pointing devices, Bluetooth devices, etc.

Computer 702 further includes a communication or network interface 718. Network interface 718 enables computer 702 to communicate with remote devices. For example, network interface 718 allows computer 702 to communicate over communication networks or mediums 728 (representing a form of a computer useable or readable medium), such as LANs, WANs, the Internet, etc. Network interface 718 may interface with remote sites or networks via wired or wireless connections.

Control logic 726 may be transmitted to and from computer 702 via communication medium 728.

Any tangible apparatus or article of manufacture comprising a computer useable or readable medium having control logic (software) stored therein is referred to herein as a computer program product or program storage device. This includes, but is not limited to, computer 702, main memory 708, secondary storage devices 710 and removable storage unit 716. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments may be applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the guidance.

The breadth and scope of the present invention should not be limited by any of the above-described exemplary embodiments, but should be defined only in accordance with the following claims and their equivalents.

What is claimed is:

1. A method for restricting execution of a superseded software program on a computing device, comprising:
    storing, in a lockable, non-volatile memory of a computing device, a locked version number associated with a software program, wherein write access to the lockable non-volatile memory is restricted for at least some software programs executing on the computing device;
    receiving a request to execute the software program associated with an execution version number; comparing, by a processor, the execution version number with the locked version number: determining, by the processor, whether to execute the software program based at least in part on the comparison: executing the software program when the execution version number is at least as recent as the locked version number; and restricting the execution of the software program when the execution version number is earlier than the locked version number.

2. The method of claim 1, wherein write access to the lockable non-volatile memory is restricted based on a privilege level of a program that attempts to access the memory.

3. The method of claim 1, wherein the lockable non-volatile memory is accessible only to read-only firmware during a boot-up sequence.

4. The method of claim 3, wherein the read-only firmware is pre-loaded by a manufacturer of the computing device.

5. The method of claim 1, further comprising:
    operating the lockable non-volatile memory in a read-and-write mode during a boot cycle while the computing device is powered on; and
    restricting write-access to the lockable non-volatile memory during operation of the computing device until a next boot cycle.

6. The method of claim 1, wherein the lockable non-volatile memory is included on a trusted platform module (TPM) chip.

7. The method of claim 1, wherein the lockable non-volatile memory is accessible by an operating system of the computing device but not by other software programs executed by the computing device.

8. The method of claim 1, wherein the lockable non-volatile memory includes:
    first locked version number storage that resides in a portion of non-volatile memory on a trusted platform module (TPM) chip, and
    and a second locked version number storage that is maintained in an association table by an operating system of the computing device.

9. The method of claim 1, further comprising:
    receiving a user input indicating a manual override of the restriction of the execution of the software program; and
    in response to the user input, executing the software program when the execution version number is earlier than the locked version number.

10. A system for restricting execution of a superseded software program, comprising:
    a non-volatile locked version number storage that stores a locked version number associated with a software program, wherein write access to the locked version number storage is restricted for at least some software programs executed by the system; and
    a processor configured to:
    execute a version comparator that compares an executing version number of a software program for which a request is received to execute the program with the locked version number;
    execute the software program when the execution version number is at least as recent as the locked version number; and
    restrict the execution of the software program when the execution version number is earlier than the locked version number.

11. The system of claim 10, wherein write access to the non-volatile locked version number storage is restricted based on a privilege level of a program that attempts to access the memory.

12. The system of claim 10, wherein the non-volatile locked version number storage is accessible only to read-only firmware during a boot-up sequence.

13. The system of claim 12, wherein the read-only firmware is pre-loaded by a manufacturer of the computing device.

14. The system of claim 10, wherein
    the non-volatile locked version number storage is operated in a read-and-write mode during a boot cycle while the computing device is powered on; and
    write-access to the non-volatile locked version number storage is restricted during operation of the computing device until a next boot cycle.

15. The system of claim 10, further comprising a trusted platform module (TPM) chip that includes the non-volatile locked version number storage.

16. The system of claim 10, wherein the non-volatile locked version number storage is accessible by an operating system of the computing device but not by other software programs executed by the computing device.

17. The system of claim 10, wherein the non-volatile locked version number storage includes:

a first locked version number storage that resides in a portion of non-volatile memory on a trusted platform module (TPM) chip, and
and a second locked version number storage that is maintained in an association table by an operating system of the computing device.

\* \* \* \* \*